Jan. 3, 1961    H. BLACKSTONE ET AL    2,967,211
OPTICAL SCANNING MECHANISM

Filed Nov. 13, 1952    3 Sheets-Sheet 1

INVENTORS
HENRY BLACKSTONE
FRANK G. WILLEY
BY Mitchell & Bechert
ATTORNEYS

Jan. 3, 1961     H. BLACKSTONE ET AL     2,967,211
OPTICAL SCANNING MECHANISM
Filed Nov. 13, 1952                                  3 Sheets-Sheet 2
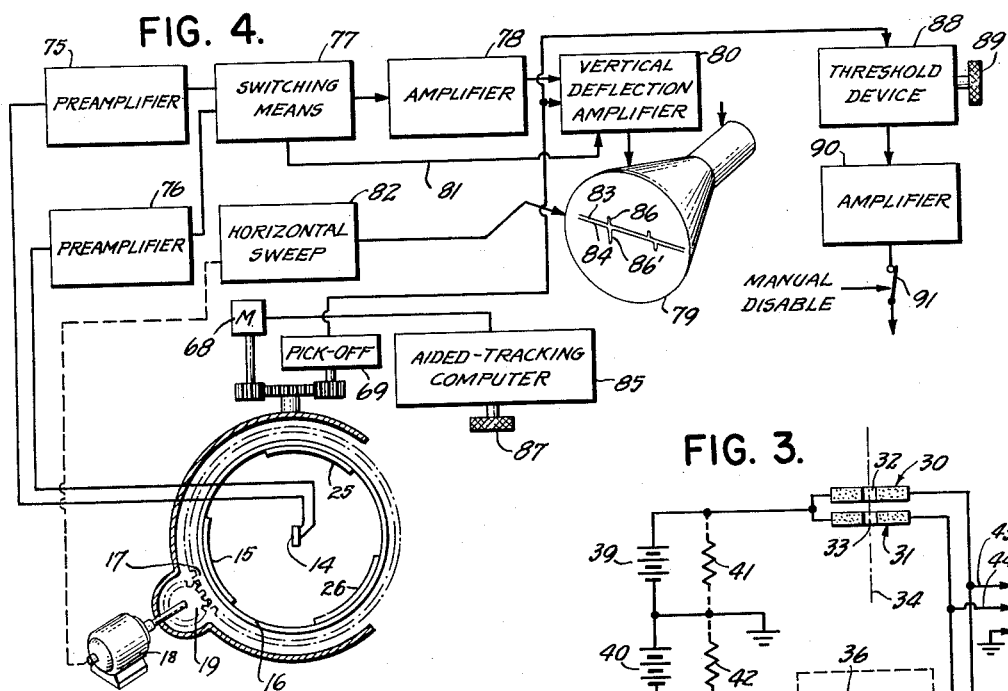
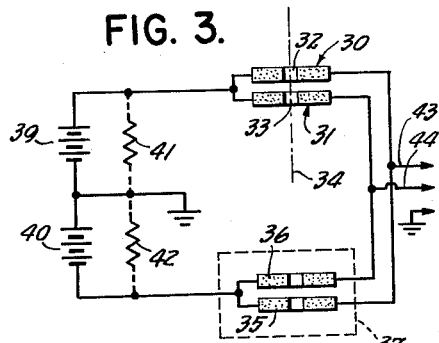
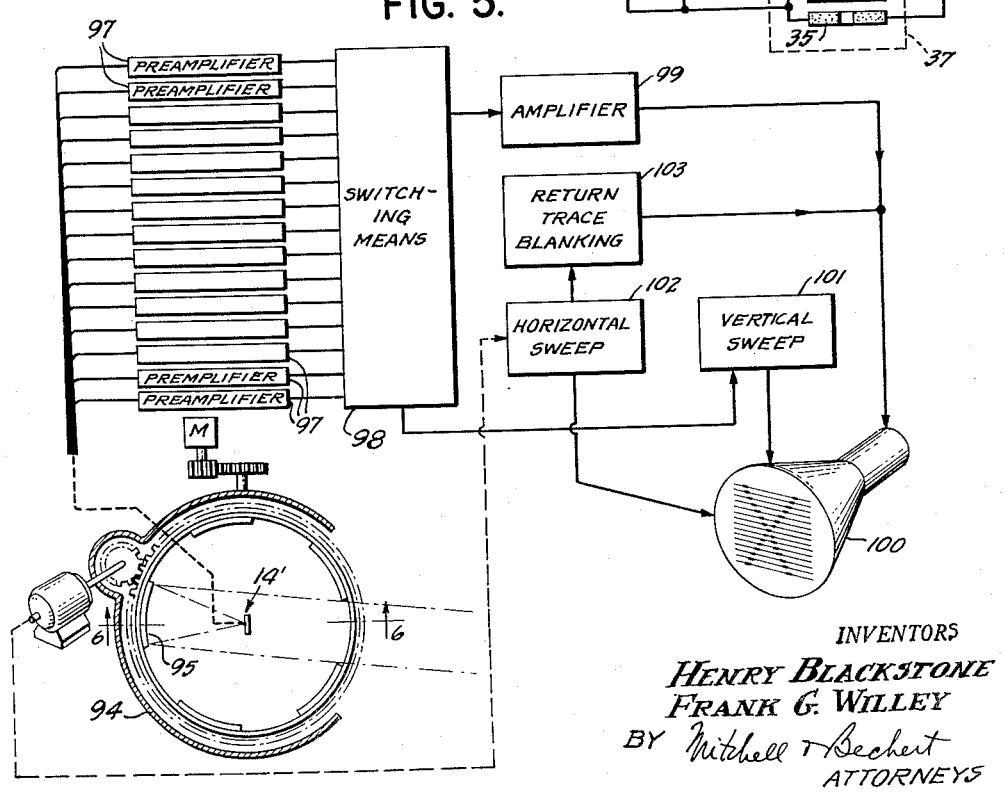
INVENTORS
HENRY BLACKSTONE
FRANK G. WILLEY
BY Mitchell + Bechert
ATTORNEYS

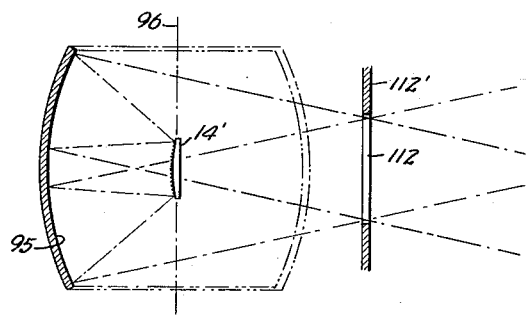
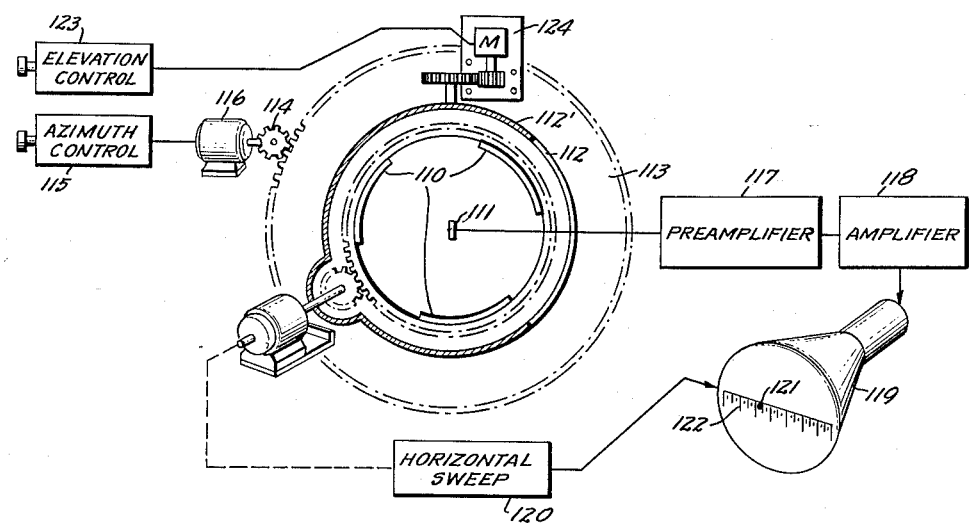
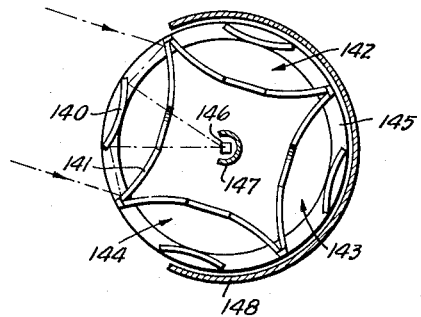
INVENTORS
HENRY BLACKSTONE
FRANK G. WILLEY
BY
ATTORNEYS

United States Patent Office 2,967,211
Patented Jan. 3, 1961

2,967,211

OPTICAL SCANNING MECHANISM

Henry Blackstone and Frank G. Willey, Roslyn, N.Y., assignors to Servo Corporation of America, New Hyde Park, N.Y., a corporation of New York Filed Nov. 13, 1952, Ser. No. 320,272

31 Claims. (Cl. 178—6.7)

Our invention relates to an improved optical scanning means and to radiation-responsive means utilizing such optical scanning.

It is an object of the invention to provide improved means of the character indicated.

It is another object to provide improved means for continuously and automatically scanning a field of view for varying energy levels in such field.

It is a further object to provide improved display means for scanning means of the character indicated.

It is also an object to provide an optical scanning mechanism of such elemental simplicity and smooth operation that noise attributable to moving parts in the scanning mechanism shall have minimum effect upon sensitive elements utilizing the scanning mechanism.

A further object is to provide an optical scanning mechanism involving steady, continuous motion of moving parts and yet a high proportionate utilization of energy collected by the optics.

It is a specific object to provide an improved optical scanning mechanism wherein optical elements may move but wherein sensitive means at the focus of such optics may be relatively fixedly mounted.

It is also a specific object to provide an improved aerial-reconnaissance device meeting the above objects.

Another specific object is to provide an improved means for automatically tracking a source of energy in spite of relative movement between the source and the point of observation.

Still another specific object is to provide a passive device which will continually alert within a given field of view, for the detection and indication of any transient radiation and for the exact automatic location of such radiation with respect to the point of observation.

Other objects and various further features of the invention will be pointed out or will occur to those skilled in the art from a reading of the following specification in conjunction with the accompanying drawings. In said drawings, which show, for illustrative purposes only, preferred forms of the invention;

Fig. 3 is an electrical diagram illustrating connection of sensitive elements in the device of Fig. 2;

Fig. 4 is a diagram schematically illustrating an alternative utilization of some of the parts of Fig. 2;

Fig. 5 is a diagram illustrating a modified construction;

Fig. 6 is an optical diagram schematically illustrating the relation of rays in the optics of Fig. 5, as viewed in the plane 6—6 of Fig. 5; and Figs. 7 and 8 are diagrams illustrating further alternative constructions.

Figure 1:
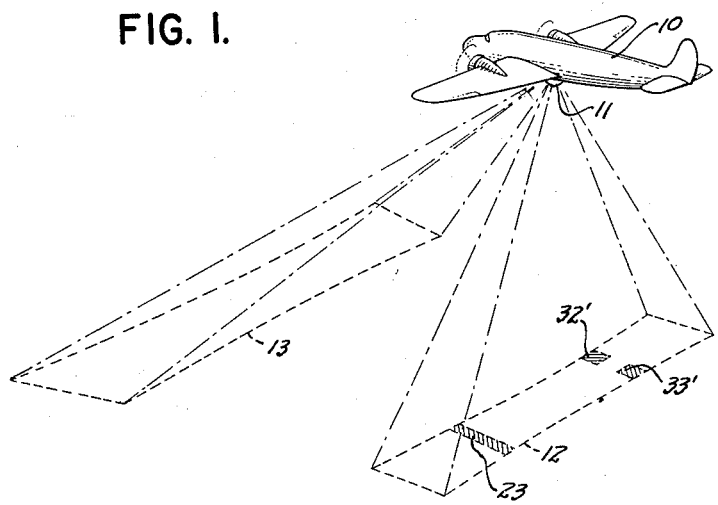
Fig. 1 is a simplified view in perspective, diagrammatically illustrating fields of view, as scanned with a device according to the invention.

Briefly stated, our invention contemplates an improved scanning device employing relatively fixed radiation-responsive means and an optical system that continuously scans a field of view while remaining focused on the sensitive means throughout the scanning cycle. The optics configuration may include an objective focused on the sensitive element, and mounted for rotation about an axis inclined to the optical axis and near the energy-responsive means. Such objectives may be lenses capable of passing the desired radiation, but in the forms to be described the objectives are mirror systems.

In each particular form to be described, all the mirror systems have the same properties and are mounted in angularly spaced relation about the rotation axis. In one form, the mirror systems are spaced by substantially their widths and are placed "behind" the rotation axis; in another form, employing Cassegrain optics, the mirror systems may be adjacent each other and placed "forward" of the rotation axis. Shielding means enshrouds the entire rotating device and provides a restricted opening to assure the effective use of but one mirror system at a time for each energy-responsive means employed. In the first form, at any one instant of time, rays emanating from a distant source of radiation enter the scanning device through the opening in the shield and through one of the openings between adjacent mirrors; these rays are collected by the particular mirror which happens to be on a remote side of the system for focusing upon the energy-responsive means centrally of the scanning head. In the other form, rays from a distant source enter through the shield opening to pass through one of a number of Cassegrain systems, for focusing on the energy-responsive means.

Various arrangements will be described utilizing a continuous scanning mechanism of the character indicated. In one form, the scan intelligence is caused to intensity-modulate a permanent strip record or a cathode-ray display device, and upon proper synchronization of the recorded or displayed scans with the actual movement of the field of view relatively to the scanning head, a picture or map may be developed. In another form, the scanning mechanism provides a means for identifying a particular source of radiation and for determining the instantaneous off-axis placement of such source with respect to the scanning mechanism. Such a device may have automatic target-tracking applications.

In still another arrangement, the energy-responsive means within the scanning head includes a plurality of elements aligned in the focal plane of the optics and oriented in a sense generally parallel to the axis of scanning rotation. In such a system, means are provided for individually applying elemental outputs in proper spaced relation in the ultimate display or record, so that for each frame scan across the field there may be an effective number of line scans in accordance with such plurality.

In a further embodiment, a continuously rotating scanning head of the character indicated may be continuously on the alert, within a sector representing the field of view, for transient radiation, as the heat burst from a gun flash; and in response to such transient radiation, the device may instantly display the bearing or other coordinate data for the location of the transient source.

Figure 2:
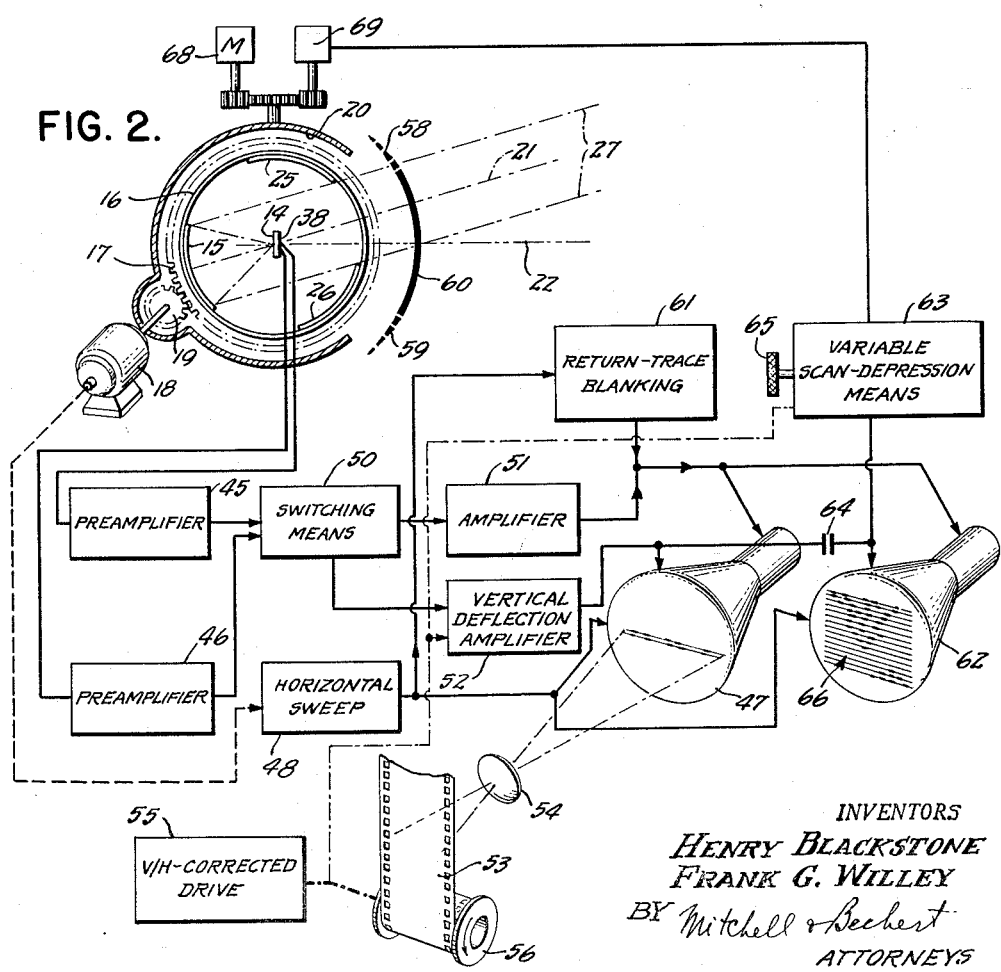
Fig. 2 is a diagram schematically illustrating component parts of a device having fields of view illustrated in Fig. 1.

Referring to Figs. 1, 2, and 3 of the drawings, our invention is shown in application to an improved airborne reconnaissance device. The scanning head may be supported beneath the fuselage of an aircraft 10 in a suitably transparent blister or dome 11. With proper orientation of the device, scanning will take place laterally of the flight axis in successive unidirectional sweeps. If the device is caused to scan directly beneath the aircraft, a particular scan may proceed from left to right, as indicated by the somewhat rectangular field 12 on the ground. If the device is trained forward in pitch, the scanning will still cover the same angular field, but the actual coverage on the ground for the same elevation may involve a larger area, as indicated at 13. For each scan, the ground coverage may have a lateral width corresponding to the full angular sweep of the scanning mechanism, and a forward-aft dimension corresponding to the effective front-to-back dimension of the energy-responsive means within the scanning head.

Referring to Fig. 2, the scanning mechanism is seen to employ an energy-responsive means 14, which is preferably fixedly mounted with respect to the particular moving parts of the scanning mechanism. The actual sensitive units employed at 14 will depend upon the radiation to be detected, and in the detection of low-temperature heat sources we have found so-called thermistor bolometer elements to provide satisfactory performance.

The optics may include a concave mirror 15, focused on the energy-responsive means 14, and mounted upon a support 16 for continuous rotation about an axis inclined to the optical axis. It so happens that this inclination in Fig. 2 is perpendicular (i.e. rotation axis perpendicular to optical axis) and that the focal point of the optics lies on the axis of rotation. The support 16 may be externally toothed, as at 17, to receive a continuous drive from motor 18 through a drive pinion 19. The entire rotating structure may be enveloped by shielding means 20, circumferentially skirting the optics except for an opening or window through which the field of view is obtained.

At the instant depicted in Fig. 2, one of the optics (15) is collecting energy on an axis 21 angularly offset from the central axis 22 of the scanning system; thus, for such instant the elemental field of view on the ground may be that indicated by the shaded element 23 in Fig. 1. As the optics continues to scan with rotation of the support 16, the elemental area 23 will move across the scan field 12 until rays collected by mirror 15 pass out of the field of view. When mirror 15 passes sufficiently around the rotary axis so that it may again collect rays within the field of view, the elemental area 23 will be swept across the field 12 once more.

In accordance with a feature of the invention, we provide for a more efficient time-utilization of the full rotation of support 16. In this connection, we provide a plurality of mirrors 25—26, in addition to the mirror 15, all angularly spaced about and carried by the support 16. The mirrors 25—26 preferably have the same optical properties as the mirror 15. The spacing between mirrors 15—25—26 is preferably equal to the effective width of these mirrors, so that the spacing between mirrors will not reduce the collecting power of any particular mirror.

In the arrangement shown in Fig. 2, the proportioning of the mirror spacings permits full utilization of the angular width of the mirrors, as illustrated by the beam thickness defined by limiting rays 27. It so happens that in the arrangement of Fig. 2, there is a fully concentric employment of all optical systems; that is, the axis 21 of incoming rays coincides with the optic axis (of mirror 15), and the focal point lies in this axis. It will be understood, however, that for eccentric employment of the rotating mirrors, it will be possible to pass incoming rays to a particular mirror without blanking by mirrors on the other side of the scanning head, so that only in the case of substantially concentric employment of the optics (15) is it necessarily preferred that there shall be an odd number of mirrors, as shown.

In the particular arrangement shown, we have employed more than one element in the energy-responsive means 14, and in Fig. 3 we illustrate a case in which such plurality includes two elements 30—31. The elements 30—31 may be matched thermistor bolometers having electrically matched characteristics and sensitive areas 32—33. The sensitive areas 32—33 are preferably spaced on what may be termed an alignment or longitudinal axis 34, oriented in a direction corresponding substantially to the flight axis—that is, in a sense parallel to the rotary axis of scan and transverse to the scanning planes. For maximum sensitivity, each of the sensitive elements 30—31 may be employed in a bridge circuit for observation against matched compensating bolometers 35—36. The bolometers 35—36 must, of course, be shielded from radiation, and this fact is schematically indicated by the dotted outline 37. It is also preferred that the housing for the sensitive elements 30—31—35—36 shall completely cover these elements on the outwardly exposed side, as indicated at 38 in Fig. 2; thus, the entire assembly of sensitive elements may be contained within housing 38 but with only the sensitive areas 32—33 aligned, exposed (rearwardly), and oriented as indicated above. The bridge circuit may operate directly from balanced regulated batteries 39—40 having preferably high internal resistance, and, if desired, balanced resistors 41—42 may also be employed (as suggested by the dashed circuit connections shown). Separate outputs from elements 30—31 may be available at 43—44 with respect to ground, for supply to separate pre-amplifiers 45—46.

In the arrangement of Fig. 2, we provide for the simultaneous visual display and permanent recording of the respective outputs of elements 30—31 for a number of successive scans, and the intelligence thus developed over a period of time is portrayed in a manner to make interpretation relatively easy. For a visual display, as on a cathode-ray tube 47, successive scans (due to sweeps of elements 30—31 across the field 12) are displayed as intensity modulations on a horizontal sweep, as supplied by sweep generator 48; and for each successive scan two such sweeps are developed, with a vertical spacing corresponding to the effective spacing of elements 30—31. The detected intelligence for the intensity modulations on these horizontal sweeps may be commutated from a high-speed switch 50, whose output is amplified at 51. In order that the two horizontal sweeps may be vertically spaced and correlated (in accordance with the relative placement of the response fields due to sensitive areas 32—33), we key the vertical-deflection amplifier 52 in synchronism with switching functions at 50. For each scan, therefore, there will be developed two vertically displaced intensity-modulated sweeps which may be focussed by optics 54 on a moving strip of sensitive recording paper, film, or the like 53. We have shown drive means 55 directly connected to a take-up spool 56 for the recording paper or film 53.

The speed with which the take-up spool 56 is driven varies preferably in accordance with the angular rate at which the scanned subject matter is passing through the field of view. In aerial-reconnaissance applications, in which the rotary axis for the scanning head will be held in a relatively fixed orientation for any one survey (e.g., horizontally oriented for the scan field 12, or pitched up 45 degrees for the scan field 13), this angular rate will be the so-called V/H rate for the aircraft; that is, the rate at which the take-up spool 56 is driven will be proportioned to that angular rate which corresponds to the forward velocity of the aircraft, divided by the ground-clearance altitude. We have schematically indicated this fact by labeling the drive mechanism 55 as a V/H-corrected drive.

If the V/H rate is to vary considerably from one reconnaissance to the next, or even during a particular reconnaissance, then we prefer that the vertical deflection amplifier 52 shall incorporate means responsive to the instantaneous V/H rate, so as to apply proper voltages to control the spacing between horizontal sweeps. Thus, if the V/H rate is high, meaning that the aircraft is flying either relatively fast or relatively close to the ground, the vertical deflection amplifier 52 will be caused to produce a relatively large change in vertical-deflection voltage level, for the keying conditions determining placement of the respective horizontal sweeps across cathode-ray tube 47. If, on the other hand, the V/H rate is low, which may be indicative of relatively slow-speed flight or of relatively high-altitude flight, then the voltage-level difference in the keying signals will be smaller. It will be appreciated that, with this correction in spacing of horizontal sweeps so as to correspond with the instantaneous V/H rate, the recorded scale may truly reflect ground conditions, the same scale applying in the vertical plane of the flight axis as in the transverse vertical plane of scanning.

In spite of the relatively efficient utilization of the total available time in the scanning mechanism of Fig. 2, there remains an interval (representing approximately 50 percent of the total time), during which the response cannot be considered strictly uniform over the entire field of scan. Viewed from another point of view, the field of the system, for uniform response across such field, is limited, due to non-uniform response at the fringes of the field. We have schematically indicated this fact by heavy tapered dotted lines 58—59 at the lateral fringes of the field scanned by the optics in Fig. 2, while the field of uniform response is indicated by a heavy solid line 60, which extends over an arc of 60 degrees, that is, 30 degrees laterally on either side of the vertical plane of the flight (longitudinal) axis. In order to eliminate electrical responses from the sensitive elements during these periods of time in which the optics itself impairs the uniformity of response, we provide for the arbitrary electrical blanking or suppression of such non-uniform responses. Circuitry to accomplish this is schematically indicated at 61, and may merely provide a keyed bias signal on the intensity grid of tube 47 in synchronism with the horizontal sweep, as will be understood.

As indicated generally above, the arrangement of Fig. 2 provides additionally for instantaneous display of a succession of sweeps as on a long-persistence cathode-ray tube 62. The tube 62 may be supplied with the same horizontal and vertical deflection signals as described for the tube 47; except that, for the development of a pictorial display on tube 62, we have provided variable scan-depression means 63 which will be appreciated as being merely a generator of a gradually varying vertical-deflection bias signal, developing in magnitude in accordance with the V/H rate, or at least in accordance with the advance of the recording film or paper 53. A capacitor 64 should serve to isolate the display means 47 from the slowly varying bias signal available from the scan-depression means 63. As far as tube 62 is concerned, a manual bias adjustment 65 provides a means for vertically locating or relocating the resulting presentation 66 on the face of tube 62.

In certain applications, it may be desired not to hold the scanning field fixed in a vertical plane (as in the case of the field 12) or in a tilted plane (as in the case of the field 13), but it may rather be preferred to scan particular ground areas either more rapidly or in closer detail. For example, in the case of a rapid scan, the entire scanning head may be trained in pitch, as by appropriate control of a pitch motor 68 to set the field of scan initially in a rearward direction as, for example, 45 degrees rearwardly of the vertical scan depicted for the field 12 in Fig. 1. The motor 68 may then be driven so as to incline the scanning axis progressively further forward, passing through the direct downward-viewing aspect for which the field 12 is applicable, and then continuously forward to a forward-viewing aspect for which the field 13 is applicable. In such a case, the variable scan-depression means 63 may control the speed of the motor 68, but we show that the means 63 may be driven in accordance with the instantaneous pitch-inclination of the scanning axis, as detected by a sensing element or pick-off device 69. This modified scan-depression intelligence should preferably be combined with the output of the V/H computer in order that the ultimate display, whether on the film 53 or on the face 66 of tube 62 will reflect the correct ground scales for both coordinates.

The arrangement of Fig. 4 represents a slight modification of the components of Fig. 2 to achieve an alternative application having special utility when it is desired to focus continuous attention on the same single energy source within a given field, although that source may be moving relative to the point of observation. In military applications, the particular source may represent a target singled for attention, and the scanning mechanism, with its interpretative and viewing means, may continuously supply the aircraft with the exact relative bearing of such target.

The scanning head for the arrangement of Fig. 4 may be the same as that of Fig. 2; therefore, where applicable corresponding reference numbers have been used for both drawings. The arrangement of Fig. 4 thus produces two concurrent electrical responses in amplifiers 75—76 for every optical sweep across the scanned field, which may be the forward field 13 (Fig. 1). Switching means 77 may again commutate the pre-amplifier outputs to further amplifier means 78 for application to the display tube 79 in the form of vertical-deflection signals.

In order to obtain information as to the sense of longitudinal off-axis placement of the target, with respect to the instantaneous field axis for the scanning mechanism, we prefer that the display signal, due to response of one pre-amplifier (75), shall be in the opposite sense from that due to the other amplifier (76); thus, the vertical deflection amplifier 80 may be keyed by switching means 77, as indicated by the connection 81, to alternate the polarity of vertical deflection signals available from amplifier 78, in accordance with the switching characteristic of means 77. These vertical deflections may be applied above and below a central horizontal-sweep axis produced by a sweep generator 82, or the vertical-deflection amplifier 80 may be keyed by means 81, to provide for the generation of slightly spaced sweep-axes 83—84, as shown on the face of tube 79.

An aided tracking computer 85, which may be a V/H computer, as described previously, may govern the automatic pitch-displacement control for motor 68 and, if desired, the resulting pitch displacement may be picked off at 69 for bias control at the vertical-deflection amplifier 80. With such an arrangement, successive horizontal sweeps may be caused to progress down the face of the tube as a run is made on a particular target, and the relative size of corresponding pips, as at 86—86', for any one target will indicate whether manual-tracking correction at 87 is necessary in order to align the scanning axis with the target. In the case depicted at 86—86', a strong target is slightly to the rear of the scanning axis, and the manual control 87 should be trimmed to depress the pitch of the scanning axis slightly beyond the orientation demanded by the prior automatic operation of the computer 85.

From the foregoing, it will be seen that we have provided a means for identifying a target and for tracking the same before the aircraft actually flies over the target. We have thus provided a means for determining in advance whether a bomb, flare, or the like should be released over the target area. If desired, such release may be automatic at a given scan-pitch angle. For this purpose, we have provided a threshold device 88 including means 89 for the automatic manual setting of the release-pitch angle. The threshold device 88 may respond to the signal developed by the pick-off 69; and, when this signal exceeds the threshold setting, an amplifier 90 may be activated to provide the desired release signal. If, at the last moment, it is decided that a release is not necessary or desirable, a manual switch 91 may disable the automatic release mechanism.

In the arrangement of Figs. 5 and 6, we show a scanning mechanism basically the same as that depicted in Fig. 2 and illustrating the employment of a relatively large plurality of individual sensitive elements in the energy-responsive means 14'. The sensitive areas of these elements may, as in the case of the elements of Fig. 3, be aligned with each other and oriented transverse to the scanning plane. We illustrate this alignment in Fig. 6, wherein the individual sensitive elements are distributed uniformly across the focal surface of the mirror means 95, which may be one of an odd number, say five, of such uniformly spaced optical elements about the rotary axis 96 of the scanning head 94. The diagram of Fig. 6 illustrates ray bundles from the extreme limits of the field of view in the fore-aft (longitudinal) direction, as far as the flight axis is concerned; the extreme ray bundles will be seen respectively to converge on the extreme limits of (and, therefore, on the extreme outer sensitive elements on) the focal surface of the energy-responsive means 14'.

Display, pitch-control, and other treatment in Fig. 5 may correspond in all respects with that described in Fig. 2. Thus, a plurality of individual pre-amplifiers 97 may be provided, one for each exposed sensitive element, and switching means 98 may commutate or sample the pre-amplifier signals for application to a single video amplifier 99 and, thence, to an intensity-modulated display tube 100. A vertical-sweep circuit 101 may be keyed in accordance with the indexing of switching functions, and a horizontal sweep circuit 102 may be governed in synchronism with rotation of the scanning head. Return-trace blanking may be effected by means 103, synchronized with the horizontal sweep and supplied as a suppression bias on the intensity-modulation signals. The resultant presentation may thus be a fully composed picture for each scan frame, there being as many scan lines in each such frame as there are sensitive elements within the scanning mechanism.

A typical display is depicted on the face of the tube 100. This display is characterized intensity modulations, which happen to be aligned in the form of a cross; if the energy responsive means 14' is a bolometer, the cross may be interpreted as a picture of heat contrast in the terrain, and may be suggestive of a highway intersection. With each succeeding scan, this pattern will migrate downward on the face of the tube 100 in accordance with the V/H rate of the aircraft carrying the scanning mechanism.

In Fig. 7, we show a further application of the principles of our invention. In this application, a continuously rotating scanning head, which is shown to include three mirrors 110, about a sensitive element 111, is driven at relatively high speed, and the element at 111 is preferably characterized by a relatively short time constant. The head may be mounted on the ground for scanning in azimuth through a window 112 in shield means 112'. Shield means 112 and the sensitive element 111 may be mounted on a platform 113, having gear means 114 for orientation in azimuth, depending upon the azimuth sector to be surveyed. For azimuth control, we provide a manually-controlled means 115 for positioning a motor 116, in driving relation with the gear 114. The output of sensitive element 111 may be coupled directly to a preamplifier 117 and then, if desired, remotely to further amplifier means 118, in order to derive intensity-modulation signals for display means 119, having preferably long-persistence characteristics. The horizontal sweep 120 may be synchronized with the scanning operation.

In operation, the azimuth field of the equipment will be continually scanned at high speed, as from left to right, with clockwise rotation in the sense of Fig. 7. Should there be a transient burst of radiation, as from a gun flash, within said field, the flash may be caused to appear in the display as a spot 121 against a graduated scale 122 to give correct bearing information. Ordinarily, the predominant heat burst characterizing a gun flash may be assumed to have an effective time duration of 15 to 20 milliseconds, and we, therefore, prefer that the scanning rate shall be such as to accomplish at least one full scan during such interval; that is, for a three-mirror system, as depicted in Fig. 7, the rate of rotation of the support for the mirrors 110 should be of the order of at least 1200 r.p.m.

In order to illustrate that the optical elements of our scanning mechanism need not be limited to an odd number of such elements, we show in Fig. 8 a configuration having an even number of collecting-optics systems. The collecting optics may in each case include lens means capable of passing the desired radiation, but in Fig. 8 we illustrate each element as a Cassegrain two-mirror system. Thus, the convex and concave mirrors 140—141 of one system of collecting optics may extend into closest adjacency with the corresponding elements of the adjacent optical systems. All optical systems 140—141, 142, 143, and 144, may be rigidly mounted on rotatable frame means (suggested at 145) and driven continuously (by means not shown) at a speed compatible with particular "spot-size" requirements and with time-constant limitations of the fixed-energy-responsive or detector means 146. Of course, since the collecting optics is in front of the detector means 146, the detector shield 147 must be open "forwardly," as shown, with respect to the opening in the outer shield 148. Electrical treatment of the signals from detector 146 may be analogous to that in other arrangements described above.

It will be seen that we have described basically simple, improved optical scanning means for radiation-responsive devices. Our scanning means provides continuous and automatic coverage of a field of view for varying energy levels in such field, and because of its steady operating speed lends itself to relatively simple display methods. Noise attributable to mechanical origins may be kept at a minimum because our construction features relatively stationary sensitive elements. The optical configurations lend themselves to efficient utilization of available packaging volume, as far as energy-collecting ability is concerned. Further, the general organization of our scanning means is particularly adaptable to reconnaissance, searching, automatic tracking, automatic warning and other important applications.

While we have described our invention in detail for the preferred forms shown, it will be understood that modifications may be made within the scope of the invention as defined in the claims which follow.

We claim:

1. Optical scanning means, comprising focusing means having a curved focal surface, relatively fixed energy-responsive means including sensitive means in a curved surface substantially in the focal surface of said focusing means, a support for said focusing means and rotatable about an axis substantially traversing said focal surface, said focusing means imaging said energy-responsive means in a field of view remote from said scanning means, and means for rotating said support.

2. Optical scanning means, comprising an odd number of like concave mirrors, said odd number exceeding one, rotatable support means for said mirrors and supporting said mirrors in angularly spaced and radially inwardly facing relation about the rotary axis of said supporting means, the focal surfaces of said mirrors passing substantially through said rotary axis, relatively fixed energy-responsive means substantially on said rotary axis and at the focus of one of said mirrors, one of said mirrors remotely imaging said energy-responsive means through the space between the two mutually adjacent mirrors that are most nearly diametrically opposed to said one mirror, whereby when said support means is rotated the remote responses of successive of said mirrors may be brought into focus at said energy-responsive means.

3. Optical scanning means, comprising a plurality of like Cassegrain optical systems, rotatable support means carrying said systems in angularly spaced relation about the rotary axis of said support means with the foci of said systems convergent substantially at the center of rotation, relatively fixed energy-responsive means substantially on said center of rotation, whereby when said supporting means is rotated successive of said systems may be brought into focus at said energy-responsive means.

4. Optical scanning means, comprising a plurality of concave mirrors, and support means holding said mirrors in equal angularly spaced and inwardly facing relation about an axis of rotation for said support means, said mirrors being angularly spaced by an amount substantially equal to the effective angular width of said mirrors about said axis whereby ray-transmission paths for said mirrors may extend remotely of said scanning means through the spaces between said mirrors.

5. A device according to claim 4, and including relatively fixed shielding means circumferentially skirting said mirrors and having an opening of angular width exceeding the angular spacing between adjacent mirrors.

6. A device according to claim 5, in which said shield opening is substantially twice the effective angular spacing between mirrors.

7. Optical scanning means, comprising relatively fixed energy-responsive means, a plurality of like objectives, rotatable mounting means supporting said objectives in angularly spaced relation about said energy-responsive means and equally radially spaced from the rotary axis of said mounting means, said energy-responsive means being at the focus of one of said objectives and said one objective imaging said energy-responsive means in a field of view remote from said scanning means, whereby upon rotation of said objectives about said energy-responsive means successive objectives will be brought into focus on said energy-responsive means, and means for angularly displacing the rotary axis of said mounting means.

8. A device according to claim 7, and including shielding means circumferentially skirting said objectives and including a part transparent to energy acceptable to said energy-responsive means and of effective angular width exceeding the effective angular width of one of said objectives, and means for rotating said shielding means about the rotary axis of said objectives.

9. A device according to claim 8, in which said energy-responsive means is directionally responsive with a fixed orientation with respect to said shield means, whereby said energy-responsive means will be carried with said shield means upon rotation of said shield means.

10. Optical scanning means, comprising a plurality of angularly spaced like focusing means about a rotary axis and having separate optical axes converging on said rotary axis, relatively fixed energy-responsive means at the focus of one of said focusing means, whereby upon rotation of said mirrors successive of said focusing means will be brought into focus on said energy-responsive means, said energy-responsive means including a plurality of independent sensitive elements substantially in the focal surface of said one mirror.

11. A device according to claim 10, in which said elements are aligned generally along said rotary axis.

12. A device according to claim 10, in which said elements are aligned generally transversely to the radial plane of sweep of said optical axes.

13. Optical scanning means, comprising focusing means, two relatively fixed energy-responsive elements in the focal surface of said focusing means, a support for said focusing means and rotatable about an axis inclined to the optical axis of said focusing means, display means including spaced substantially parallel display axes, amplifying means separately responsive to the output of said elements and connected to modulate the display on one of said display axes in response to the output of one of said elements and connected to modulate the display on the other of said display axes in response to the output of the other of said elements.

14. Optical scanning means, comprising focusing means, a relatively fixed energy-responsive element in the focal surface of said focusing means, said focusing means imaging said element in a field of view remote from said scanning means, a support for said focusing means and rotatable about an axis inclined to the optical axis of said focusing means, means for continuously rotating said support, whereby said element is caused periodically to scan a line in said field, display means including a sweep synchronized with the optical sweep produced by rotation of said support, a display-modulating means, and signal-processing means responsive to the output of said element and connected to said last-defined means.

15. Scanning means according to claim 14, including a second relatively fixed energy-responsive element spaced from said first element and in the focal surface of said focusing means, said signal-processing means including time-multiplexing means responsive to both elements for combining the outputs thereof in a single channel, and means connecting said single channel to said display-modulating means and including means producing a deflection generally transverse to the axis of said sweep and synchronized with the alternations of said multiplexing means.

16. Scanning means according to claim 14, in which said display-modulating means includes intensity-modulation means.

17. Scanning means according to claim 14, in which said display-modulating means includes amplitude-modulating means.

18. Optical scanning means, comprising focusing means, two relatively fixed energy-responsive elements in the focal surface of said focusing means, a support for said focusing means and rotatable about an axis inclined to the optical axis of said focusing means and substantially including said elements, switching means commutating the outputs of said elements at a relatively high sampling rate compared with the expected maximum frequency response of said elements, and display means modulated with the commutated output and including a first sweep synchronized with the step function of said switching means, and a second sweep synchronized with rotation of said support.

19. Optical scanning means, comprising focusing-mirror means, relatively fixed energy-responsive means at the focus of said mirror means, said mirror means imaging said energy-responsive means in a field of view remote from said scanning means, a support for said mirror means and rotatable about an axis inclined to the optical axis of said mirror means and passing through said energy-responsive means, means for continuously rotating said support, whereby said energy-responsive means may scan a line in the field of view, display means including a sweep synchronized with rotation of said support, and an intensity modulation on said sweep and responsive to the output of said energy-responsive means.

20. Scanning means according to claim 19, and including blanking means for suppressing said intensity modulating means and synchronized with rotation of said support.

21. Optical scanning means, comprising focusing means, a plurality of energy-responsive elements in the focal surface of said focusing means and relatively fixed, a support for said focusing means and rotatable about an axis substantially aligned with said elements, means for continuously rotating said support, and display means including a sweep synchronized with rotation of said support, switching means commutating the outputs of said elements, intensity-modulating means for said display means and responsive to the commutated output, and a second sweep transverse to said first-mentioned sweep and modulated in response to the instantaneous control function of said commutating means.

22. Scanning means according to claim 21, and including variable means for biasing said second sweep, whereby the display may be displaced accordingly on said display means.

23. A device according to claim 22, and including means for angularly displacing the rotary axis of said support, and means synchronizing said last-defined means with operation of said biasing means.

24. An optical scanner, comprising a focused optical system, a plurality of relatively fixed energy-responsive elements at the focus of said system and generally aligned with one another, a support for said system and rotatable about an axis in general alignment with the axis of said elements, a switch commutating the outputs of said elements, cathode-ray display means intensity-modulated with the output of said switch, said display means including a first sweep synchronized with rotation of said support, a second sweep transverse to said first sweep and responsive to the commutating function of said switch, photographic recorder means focused on said display means and including recording paper or the like, whereby an image of the cathode-ray display may be recorded along a recording axis corresponding to the axis of said first sweep, one of said means being movably mounted with respect to the other of said means in a sense transverse to the recording axis, whereby successive sweeps may be recorded side by side on said recording paper or the like.

25. A device according to claim 24, in which the axis of rotation of said support is angularly displaceable, and in which said one movably mounted means is movable in response to the instantaneous angular position of said rotary axis.

26. An aircraft-reconnaissance device, comprising optical scanning means and a recorder, said optical means including focusing means, relatively fixed energy-responsive means at the focus of said focusing means, means for continuously rotating said focusing means about an axis inclined to the optical axis of said focusing means and substantially intersecting said energy-responsive means, said recorder including a longitudinally movable strip of sensitized paper or the like, and means for impressing intensity-modulated sweeps on said paper or the like in response to the output of said energy-responsive means and in synchronism with rotation of said focusing means, a velocity-altitude computer, and means for advancing said paper or the like in response to the output of said computer.

27. A device according to claim 26, in which said energy-responsive means includes a plurality of sensitive elements aligned in the general direction of the axis of rotation, said recorder including means for separately applying intensity-modulated sweeps to said paper or the like in response to the respective outputs of said elements and in spaced relation in the sense of movement of said paper or the like, and means controlling the spaced relation of said sweeps in response to the output of said computer.

28. An airborne scanning device, comprising optical scanning means and a cathode-ray display, said optical means including focusing means, relatively fixed energy-responsive means at the focus of said focusing means, means for continuously rotating said focusing means about an axis inclined to the optical axis of said focusing means and substantially intersecting said energy-responsive means, said display including a horizontal sweep synchronized with rotation of said focusing means, means for intensity-modulating said sweeps in response to the output of said energy-responsive means, vertical-depression means for said display, and computer means responsive to velocity as a function of altitude and in controlling relation with said vertical-depression means.

29. Optical scanning means, comprising focusing means, two relatively fixed energy-responsive elements in the focal surface of said focusing means, a support for said focusing means and rotatable about an axis inclined to the optical axis of said focusing means, display means including spaced substantially parallel display axes, amplifying means separately responsive to the output of said elements and connected to modulate the display on one of said display axes in response to the output of one of said elements and connected to modulate the display on the other of said display axes in response to the output of the other of said elements, said modulations on said display axes being substantially perpendicular to said substantially parallel display axes and being of opposite polarity for modulations on one of said display axes with respect to those on the other of said display axes.

30. Optical scanning means, comprising a relatively fixed energy-responsive element, optics including a focusing element rotatably mounted about said energy-responsive element and imaging said energy-responsive element in a field of view remote from said scanning means, the axis of said focusing element being substantially radial with respect to the axis of rotation.

31. Optical scanning means, comprising a relatively fixed energy-responsive element, a plurality of like focusing elements, means rotatably mounted about said energy-responsive element and supporting said focusing elements in equal angularly spaced relation to image said energy-responsive element in a field of view remote from said scanning means, and a shield fixed with respect to said energy-responsive element and peripherally encompassing said scanning means except for an effectively open arcuate region determining response of said energy-responsive element to one of said focusing elements at a time.

References Cited in the file of this patent

UNITED STATES PATENTS

| | | |
|---|---|---|
| 1,787,920 | Watson | Jan. 6, 1931 |
| 2,298,911 | Young | Oct. 13, 1942 |
| 2,361,447 | Baker | Oct. 31, 1944 |
| 2,465,957 | Dienstback | Mar. 29, 1949 |
| 2,477,821 | Potts | Aug. 2, 1949 |